B. D. NORTHRUP.
SPEED CHANGING MECHANISM.
APPLICATION FILED APR. 8, 1910.

1,007,963.

Patented Nov. 7, 1911.

WITNESSES.
J. R. Keller
John F. Hill

INVENTOR.
Blancher D. Northrup
by
F. Warren Kay,
attorney

UNITED STATES PATENT OFFICE.

BLANCHER D. NORTHRUP, OF WASHINGTON, PENNSYLVANIA, ASSIGNOR OF ONE-HALF TO ARTHUR R. McCAUSLAND, OF WASHINGTON, PENNSYLVANIA.

SPEED-CHANGING MECHANISM.

1,007,963.  Specification of Letters Patent.  Patented Nov. 7, 1911.

Application filed April 8, 1910.  Serial No. 554,123.

*To all whom it may concern:*

Be it known that I, BLANCHER D. NORTHRUP, a resident of Washington, in the county of Washington and State of Pennsylvania, have invented a new and useful Improvement in Speed-Changing Mechanism; and I do hereby declare the following to be a full, clear, and exact description thereof.

My invention relates to speed changing mechanism, and more especially to speed reversing mechanism for use with oil well and like machinery. Its object is to provide a simple reversing mechanism, which can be conveniently set up in the field or in any desired location, is compactly constructed, and is in all respects suitable for use in oil well and like operations. It will be understood however, that I claim for my invention all uses to which it is applicable.

It consists, generally stated, in a driving shaft suitably supported and driven in any desired manner, a driven wheel rotatable on said driving shaft and a clutch adapted to fix said driven wheel to said shaft, a countershaft suitably supported, a wheel on said countershaft, a driving connection between said wheel and said driven wheel, mechanism connecting said driving shaft to said countershaft, and another clutch adapted to actuate said driven wheel through said connecting mechanism.

Figure 1:
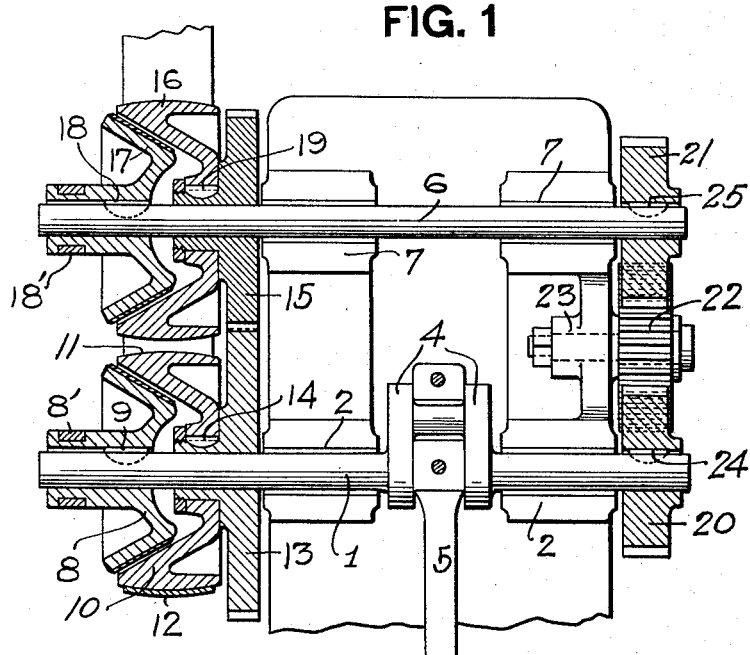
Figure 2:
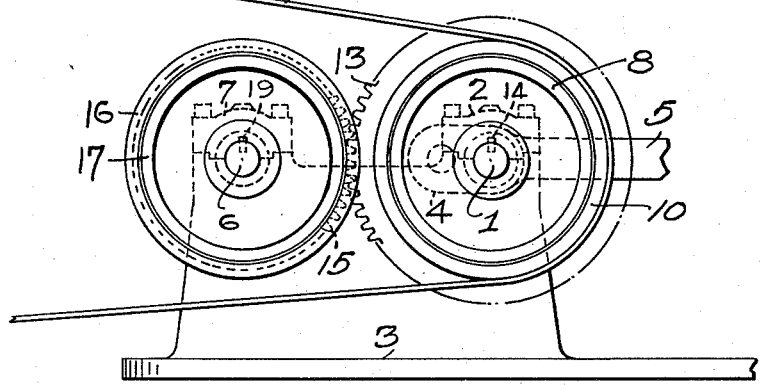
Figure 3:
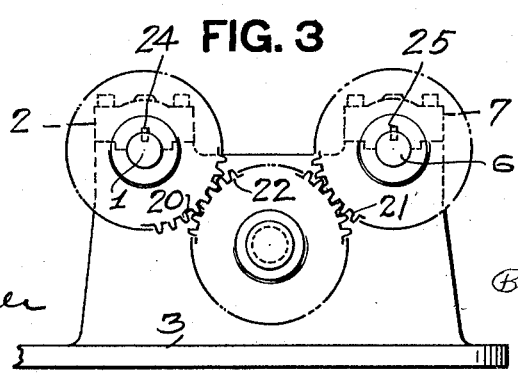

In the accompanying drawings, Figure 1 is a horizontal section illustrating my invention; Fig. 2 is an end view of the apparatus shown in Fig. 1, and Fig. 3 is another end view, partly diagrammatic, looking at the other end of the apparatus of Fig. 1.

In the speed changing mechanism illustrated, the driving shaft 1 is supported in suitable journals or housings 2 illustrated as attached to one end of the engine bed plate 3. The driving shaft 1 is actuated through the crank-arms 4 and connecting rod 5 of the engine. The countershaft 6 is journaled in a housing 7 similar to the housing 2 and is carried in close proximity to and parallel with the driving shaft 1.

While in the embodiment of my invention illustrated the parts are shown for convenience as carried upon the engine bed plate, it will be understood that while this is a compact and convenient arrangement that my invention is not in any manner limited thereto, and can be set up in any desired fashion so long as it embodies the features presently to be described.

The internal friction clutch member 8 is splined to the driving shaft 1 at 9 and is adapted to lock with the external friction clutch member 10 journaled thereon, illustrated as a pulley wheel, and having the pulley face 11. This wheel 10 constitutes the driven wheel of the mechanism and from it the power may be transmitted in any desired fashion, as by the belt 12. The pulley wheel 10 is rigid with the gear wheel 13, which is preferably connected to the same by the key 14. The gear wheel 15 shown journaled on the countershaft 6 is in mesh with the gear wheel 13 and forms with it the driving connection between the wheel 16 and the driven wheel 10, being preferably keyed to the wheel 16 at 19. The wheel 16 forms one member of the friction clutch 16, 17, the member 17 being splined to the countershaft 6 at 18. The clutch members 8, 18 are actuated through the collars 8', 18' by any convenient lever mechanism, not illustrated.

As illustrated, the countershaft 6 is connected to the driving shaft 1 by the gear wheels 20, 21 and the pinion 22 which is journaled in the housing 23. The gear wheels 20, 21 are shown keyed to the shafts 1 and 6 at 24 and 25 respectively, so that the countershaft 6 is driven continuously in the same direction as the driving shaft 1. Thus, in the preferred form illustrated, when running at forward speed, the clutch 8 locked to the driven wheel 10, is driven forwardly at the driving shaft speed. The countershaft 6 meanwhile revolves idly under the influence of the gear wheels 20, 21. The reverse speed is obtained by unsetting the clutch 8 and setting the clutch 17. The forward rotation of the countershaft 6 is then communicated to the gear wheel 15, which drives the gear 13 and the driven wheel 10 in a backward direction at any desired rate of speed depending on the relative size of the wheels 13 and 15.

While in the preferred construction I prefer to provide the gear wheel 15, or, which is the same thing, the wheel 16 with a clutch adapted to fix it to the countershaft 6, still it is obvious that the same result may be obtained by fixing the gear wheel 15 to the countershaft 6 and providing either one of the wheels 20 or 21 with a clutch to fix it, to the shaft 1 or 6 respectively.

What I claim as new is:

1. In speed changing mechanism a driving shaft, a driven wheel rotatable thereon, means for transmitting motion therefrom, and a clutch adapted to fix said wheel to said shaft, a countershaft suitably supported, a wheel on said countershaft, a driving connection between said wheel and said driven wheel, mechanism connecting said driving shaft to said countershaft, and another clutch coöperating therewith to actuate said wheel on said countershaft from said driving shaft.

2. In speed changing mechanism, a driving shaft, a driven wheel rotatable thereon and a clutch adapted to fix it thereto, a countershaft suitably supported, a wheel thereon having a connection with said driven wheel, another wheel on said driving shaft, another wheel on said countershaft, and a driving connection between them, two of said last mentioned wheels being fixed to their respective shafts, and a clutch adapted to fix the third of said wheels to its shaft.

3. In speed changing mechanism, a driving shaft, a driven wheel rotatable thereon, means for transmitting motion therefrom, and a clutch adapted to fix said wheel to said shaft, in combination with a countershaft suitably supported, gearing connecting said countershaft to said driving shaft, a wheel rotatable on said countershaft, a clutch adapted to fix it thereto, and means for actuating the aforesaid driven wheel from said wheel.

4. In speed changing mechanism, a driving shaft, a driven wheel rotatable thereon, and a clutch adapted to fix it thereto, a countershaft suitably supported, a gear wheel rotatable on said countershaft, and a clutch adapted to fix it thereto, a gear wheel on said driving shaft rigid with said driven wheel and in mesh with aforesaid gear wheel on said countershaft, and a separate driving connection between said driving shaft and said countershaft.

5. In speed changing mechanism, a driving shaft, a driven wheel rotatable thereon, and a clutch adapted to fix it thereto, a countershaft suitably supported, a gear wheel rotatable on said countershaft, and a clutch adapted to fix it thereto, a gear wheel on said driving shaft rigid with said driven wheel and in mesh with aforesaid gear wheel on said countershaft, a gear wheel fixed to said driving shaft, a gear wheel fixed to said countershaft, and a pinion in mesh with each of said wheels.

6. In speed changing mechanism a driving shaft, a driven wheel rotatable thereon and a clutch adapted to fix it thereto, in combination with a countershaft, gearing carried by said driving shaft and said countershaft and connected to said driven wheel, a clutch adapted to connect said gearing to said countershaft, and a separate driving connection between said driving shaft and said countershaft.

7. In speed changing mechanism a driving shaft, a driven wheel rotatable thereon, means for transmitting motion from said wheel, and a clutch adapted to fix said wheel to said shaft, in combination with a countershaft suitably supported, a wheel thereon, a driving connection between said wheel and said driven wheel, mechanism continuously connecting said driving shaft to said countershaft and another clutch coöperating therewith to actuate said wheel on said countershaft and said driven wheel.

8. In speed changing mechanism, a driving shaft, a driven wheel rotatable thereon, means for transmitting motion therefrom, and a clutch adapted to fix said wheel to said shaft, a countershaft suitably supported, a wheel on said countershaft, a driving connection between said wheel and said driven wheel, mechanism connecting said driving shaft to said countershaft, and another clutch coöperating therewith to actuate said wheel on said countershaft.

In testimony whereof, I the said BLANCHER D. NORTHRUP have hereunto set my hand.

BLANCHER D. NORTHRUP.

Witnesses:
J. M. PRIGG,
J. C. BRYANT.

Copies of this patent may be obtained for five cents each, by addressing the "Commissioner of Patents, Washington, D. C."